Patented May 3, 1938

2,115,905

UNITED STATES PATENT OFFICE 2,115,905

METHOD OF MAKING ESTERS OF GLYCOLS

Gerald H. Coleman and Garnett V. Moore, Midland, Mich., assignors to The Dow Chemical Company, Midland, Mich., a corporation of Michigan No Drawing. Application October 21, 1935, Serial No. 45,963

10 Claims. (Cl. 260—106)

This invention concerns an improved method of making a glycol di-ester by reaction of an alkylene dichloride with an alkali metal salt of an aliphatic acid.

In our co-pending application, Serial Number 609,494, filed May 5, 1932, now Patent No. 2,021,852 of which the present application is a continuation-in-part, we have disclosed that a glycol di-ester may be prepared in good yield by reacting an alkylene dichloride with an alkali metal salt of a fatty acid in the presence of certain catalysts, and have claimed the process when carried out in the presence of an organic nitrogen base as catalyst. The present application deals particularly with the use of water as a catalyst in the aforementioned reaction.

It is known that an alkylene dichloride and an alkali or alkaline earth metal salt of a fatty acid do not react readily when heated together under pressure in the absence of other agents. It is also known that they will react when heated together in the presence of a considerable proportion of water as a reaction solvent with, however, the formation of a mixture of difficultly separable products. For instance, Meyer, in German Patent No. 332,677, has shown that when anhydrous ethylene dichloride is heated with anhydrous sodium acetate, under pressure at 230° C. for several hours, only a trace of reaction occurs. On the other hand, McElroy, U. S. Patent No. 1,259,758, reacted a chlorinated hydrocarbon mixture containing ethylene dichloride with calcium acetate in the presence of a considerable proportion of water (i. e., from about 2 to 2.5 parts by weight of water for each part of calcium acetate) to form a product containing an ethylene glycol acetate. He does not state the yield or purity of his glycol acetate product, nor does he specify whether it is the mono- or di-acetate of ethylene glycol which is obtained. We have found that when ethylene dichloride is reacted with calcium acetate in the presence of such large proportion of water, the reaction proceeds slowly and ethylene glycol diacetate is obtained in low yield and intermixed with undesirable by-products such as ethylene glycol, ethylene glycol monoacetate, etc., from which it can be separated only with difficulty.

We have now found that water in small proportion catalyzes the reaction of an alkylene dichloride with an alkali metal salt of a fatty acid and that by carrying the reaction out in the presence of not more than 0.1 mol. of water per mol. of the fatty acid salt, a glycol di-ester may be produced in excellent yield and in a form substantially free of difficultly separable by-products such as free glycols, or glycol mono-esters. The invention, accordingly, consists in the method of making glycol di-esters hereinafter fully described and particularly pointed out in the claims.

In preparing ethylene glycol diacetate by our method, an alkali metal acetate is heated under pressure to a reaction temperature between 175° and 250° C. with preferably more than its molecular equivalent of ethylene dichloride and with a catalytic amount of water not substantially in excess of 0.1 mol. per mol. of the acetate. The water may be added as such to the initial reaction mixture, or hydrated compounds such as $FeSO_4.7H_2O$, $CuSO_4.5H_2$, $MgSO_4.7H_2O$, $CuCl_2.2H_2O$, hydrated sodium acetate, or other hydrated organic salt may be added in the proportion required to supply the necessary water. The reaction mixture is preferably agitated during the heating operation. The reaction, when carried out at 175° to 250° C., usually is substantially complete after from 3 to 8 hours of heating, but longer heating is sometimes required, particularly when the reaction is carried out at lower temperatures. The reacted mixture is then cooled, filtered to remove alkali metal chloride therefrom, and the filtrate is fractionally distilled to separate the ethylene glycol diacetate product in substantially pure form.

The following examples describe a number of ways in which the principle of the invention has been applied, but are not to be construed as limiting the invention:—

Example I 297 grams (3.0 mols) of ethylene dichloride, 192 grams (2.0 mols) of sodium propionate, and 1.8 grams (0.1 mol.) of water were heated together in a rotating bomb at a temperature of approximately 210° C. for 6 hours. The bomb was then cooled to room temperature and the charge removed therefrom. The reacted mixture was filtered, and the filtrate fractionally distilled to obtain 148 grams (0.85 mol.) of substantially pure ethylene glycol dipropionate. This was a yield of 85.0 per cent of theoretical, based on the quantity of sodium propionate used.

Example II

Into a rotating bomb were placed 99 grams (1.0 mol.) of ethylene dichloride, 82 grams (1.0 mol.) of sodium acetate, and 1.4 grams (0.078 mol.) of water. The bomb was sealed, rotated, and heated to a temperature of approximately 175° C. for 6 hours, after which it was cooled to room temperature and the charge removed. The reaction mixture was filtered to remove sodium chloride therefrom, and the filtrate fractionally distilled, whereby 63.14 grams (0.43 mol.) of substantially pure ethylene glycol diacetate was separated. The yield of said ester product was 86.5 per cent of theoretical, based on the quantity of sodium acetate used.

Example III 99 grams (1.0 mol.) of ethylene dichloride, 82 grams (1.0 mol.) of sodium acetate, and 3.1 grams of hydrated ferrous sulphate, $FeSO_4.7H_2O$, were heated together in a rotating bomb at a temperature of approximately 200° C. for 6 hours. The bomb was then cooled to room temperature and the charge removed therefrom. The reacted mixture was filtered, and the filtrate fractionally distilled to obtain 110.23 grams (0.755 mol.) of substantially pure ethylene glycol diacetate. This was a yield of 75.5 per cent of theoretical, based on the quantity of sodium acetate used. 1.4 grams (0.078 mol.) of water were supplied to the reaction by the hydrated ferrous sulphate. The presence of the ferrous sulphate group had no apparent effect on the reaction.

Example IV

Into a rotating bomb were placed 594 grams (6.0 mols) of ethylene dichloride, 328 grams (4.0 mols) of sodium acetate and 1.44 grams (0.08 mol.) of water. The bomb was sealed, rotated, and heated to a temperature of approximately 240° C. for 6 hours, after which it was cooled to room temperature and the charge removed. The reaction mixture was filtered to remove sodium chloride therefrom, and the filtrate fractionally distilled, whereby 487.64 grams (3.34 mols) of substantially pure ethylene glycol diacetate was separated. The yield of said ester product was 83.5 per cent of theoretical, based on the quantity of sodium acetate used.

We have found that, when ethylene dichloride is heated with sodium acetate, in the absence of water, at 200° C. for as long as 10.5 hours, no appreciable reaction occurs. The quantity of water required to catalyze the reaction has been found to vary with the reaction temperature. At temperatures below 175° C. no appreciable reaction takes place, even in the presence of 0.1 mol. of water per mol. of sodium acetate employed. At temperatures between 175° and 250° C. about 0.02 mol. or more of water per mol. of sodium acetate is generally required. Temperatures appreciably higher than 250° C., even in the presence of the above amounts of water, cause excessive tar formation, decomposition and side reactions.

Similarly, we have reacted propylene dichloride with sodium acetate to obtain propylene glycol diacetate; 1,2-butylene dichloride with sodium acetate to obtain 1,2-butylene glycol diacetate; and ethylene dichloride with sodium butyrate to form ethylene glycol dibutyrate, said reactions being carried out in the presence of catalytic amounts of water.

In place of a sodium salt of an aliphatic acid, the corresponding potassium salt (e. g. potassium acetate, potassium propionate, etc.) or, in fact, any corresponding alkali metal salt of such acid may be used in carrying out the method of the invention.

The excess of alkylene dichloride employed in carrying out our invention serves as a dispersant for the alkali metal salt and aids in the maintenance of an even reaction temperature. The reaction may, however, be carried out with equimolecular quantities of the two reactants or by heating the aforementioned alkali metal salt with less than its chemical equivalent of an alkylene dichloride. The amount of water used should not exceed about 0.1 mol. for each mol. of aliphatic acid salt employed. When a greater proportion of water is used a considerable part of the glycol di-ester product is hydrolyzed, with resultant formation of appreciable quantities of by-products such as glycols, glycol mono-esters, etc., which can be removed from the glycol di-ester product only with difficulty.

Other modes of applying the principle of our invention may be employed instead of those explained, change being made as regards the method herein disclosed, provided the means stated in any of the following claims or the equivalent of such stated means be employed.

We therefore particularly point out and distinctly claim as our invention:

1. The method of making a glycol di-ester which comprises heating an alkylene dichloride with an alkali metal salt of a lower fatty acid at a reaction temperature between about 175° and about 250° C., in the presence of between about 0.02 and about 0.1 mol. of water per mol. of such salt.

2. The method of making a glycol di-ester which comprises heating an alkylene dichloride with an alkali metal salt of a lower fatty acid under super-atmospheric pressure at a temperature between about 175° and about 250° C., in the presence of a catalytic amount of water not substantially in excess of 0.1 mol. per mol. of such salt.

3. The method of making an ethylene glycol di-ester which comprises heating ethylene dichloride with an alkali metal salt of a lower fatty acid under super-atmospheric pressure at a temperature between about 175° and about 250° C., in the presence of a catalytic amount of water not substantially in excess of 0.1 mol. per mol. of such salt.

4. The method of making a glycol diacetate which comprises reacting an alkylene dichloride with an alkali metal salt of acetic acid in the presence of a catalytic amount of water not substantially in excess of 0.1 mol. per mol. of such salt, and at a temperature between about 175° and about 250° C.

5. The method of making a glycol dipropionate which comprises reacting an alkylene dichloride with an alkali metal salt of propionic acid in the presence of a catalytic amount of water not substantially in excess of 0.1 mol. per mol. of such salt, and at a temperature between about 175° and about 250° C.

6. The method of making ethylene glycol diacetate which comprises heating ethylene dichloride with an alkali metal salt of acetic acid under super-atmospheric pressure at a temperature between about 175° and about 250° C., in the presence of a catalytic amount of water not substantially in excess of 0.1 mol. per mol. of such salt.

7. In a method of making ethylene glycol diacetate, the steps which consist in heating sodium acetate with an excess of ethylene dichloride under super-atmospheric pressure at a temperature between about 175° and about 250° C., in the presence of a catalytic amount of water not substantially in excess of 0.1 mol. per mol. of sodium acetate used, and fractionally distilling the reaction mixture to separate ethylene glycol diacetate therefrom.

8. In a method of making ethylene glycol diacetate, the steps which consist in heating sodium acetate with not less than its molecular equivalent of ethylene dichloride, under super-atmospheric pressure at a temperature between about 175° and about 250° C., in the presence of a catalytic amount of water not substantially in excess of 0.1 mol. per mol. of sodium acetate used, and fractionally distilling the reaction mixture to separate ethylene glycol diacetate therefrom.

9. The method of making ethylene glycol dipropionate which comprises heating ethylene dichloride with an alkali metal salt of propionic acid, under super-atmospheric pressure at a temperature between about 175° C. and about 250° C., in the presence of a catalytic amount of water not substantially in excess of 0.1 mol. per mol. of such salt.

10. In a method of making ethylene glycol dipropionate, the steps which consist in heating sodium propionate with not less than its molecular equivalent of ethylene dichloride under super-atmospheric pressure at a temperature of about 210° C., in the presence of approximately 0.05 mol. of water per mol. of sodium propionate used, and fractionally distilling the reaction mixture to separate ethylene glycol dipropionate therefrom.

GERALD H. COLEMAN.
GARNETT V. MOORE.